8516X
W. Burk,
Screw Propeller.
Patented Dec. 2, 1834.
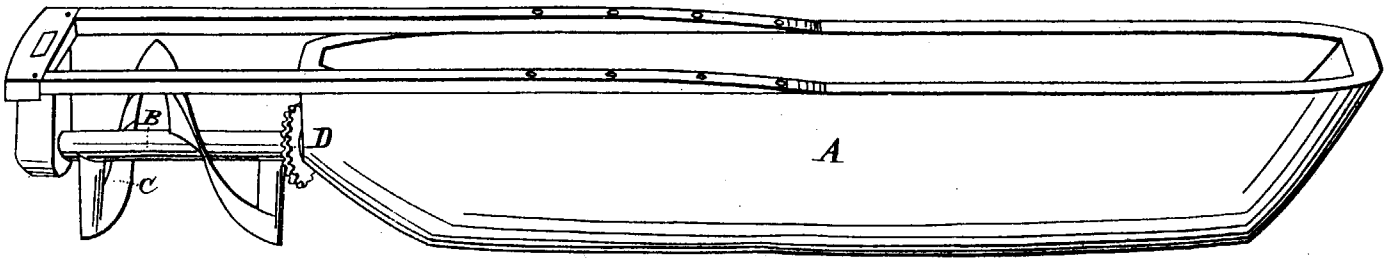
N. PETERS, PHOTO-LITHOGRAPHER, WASHINGTON, D. C.

William Burk Whitemarsh Pa.

Letters Patent

The Schedule referred to in these Letters Patent and making part of
the same containing a description in the words of the said William
Burk himself of his improvement in a Machine or Screw for the
purpose of propelling Canal & other boats Rafts and Water Craft To all to whom these presents shall come.—
Be it known that I William Burk of Whitemarsh in the County of
Montgomery and State of Pennsylvania have invented a new and
useful Machine or Screw for the purpose of propelling Canal and other
Boats Rafts and Water Crafts and that the following is a full and
exact description of the Construction and operation of said Machine
as invented by me.

The Machine is on the principle of a Screw the worm
or thread as it may be termed to wind around a small shaft one
two, three or more times as will best suit the motion of the machine
as per Model. The size of the Screw to be regulated by the size of the
boat attached to the Screw is to be composed of wood, Iron, Copper, Brass
Tin or any other species of metal best adapted to the construction of the
same. There is to be a small Cog wheel pully or Crank on the
shaft as will best suit the gearing to the boat.

This Machine is intended to be applied to either end or both
ends, or both sides or to the middle, of the boats intended to be propelled
at the option of the Patentee or the person or persons having a legal right
to use the same.

The Machine or Screw is intended to be used to propell
Canal Boats [illegible] Boats and every other species of boats, Rafts and
Water Crafts, It is intended to be put in motion by Steam power horse power
or hand power, or any other power, This machine or Screw has an advan Drawing over

[illegible] accordingly [illegible] proper [illegible] and other to obtain the facility and [illegible] through [illegible] with the least agitation.

Witnesses

Thos Brock

Francis Ricks

Wm Burke 403 rots (Patented December 2. 1834).